C. J. GLASEL.
PROCESS OF TREATING HIDES AND HIDE TREATING APPARATUS.
APPLICATION FILED APR. 12, 1917.

1,414,404.

Patented May 2, 1922.
9 SHEETS—SHEET 1.

INVENTOR
Charles John Glasel

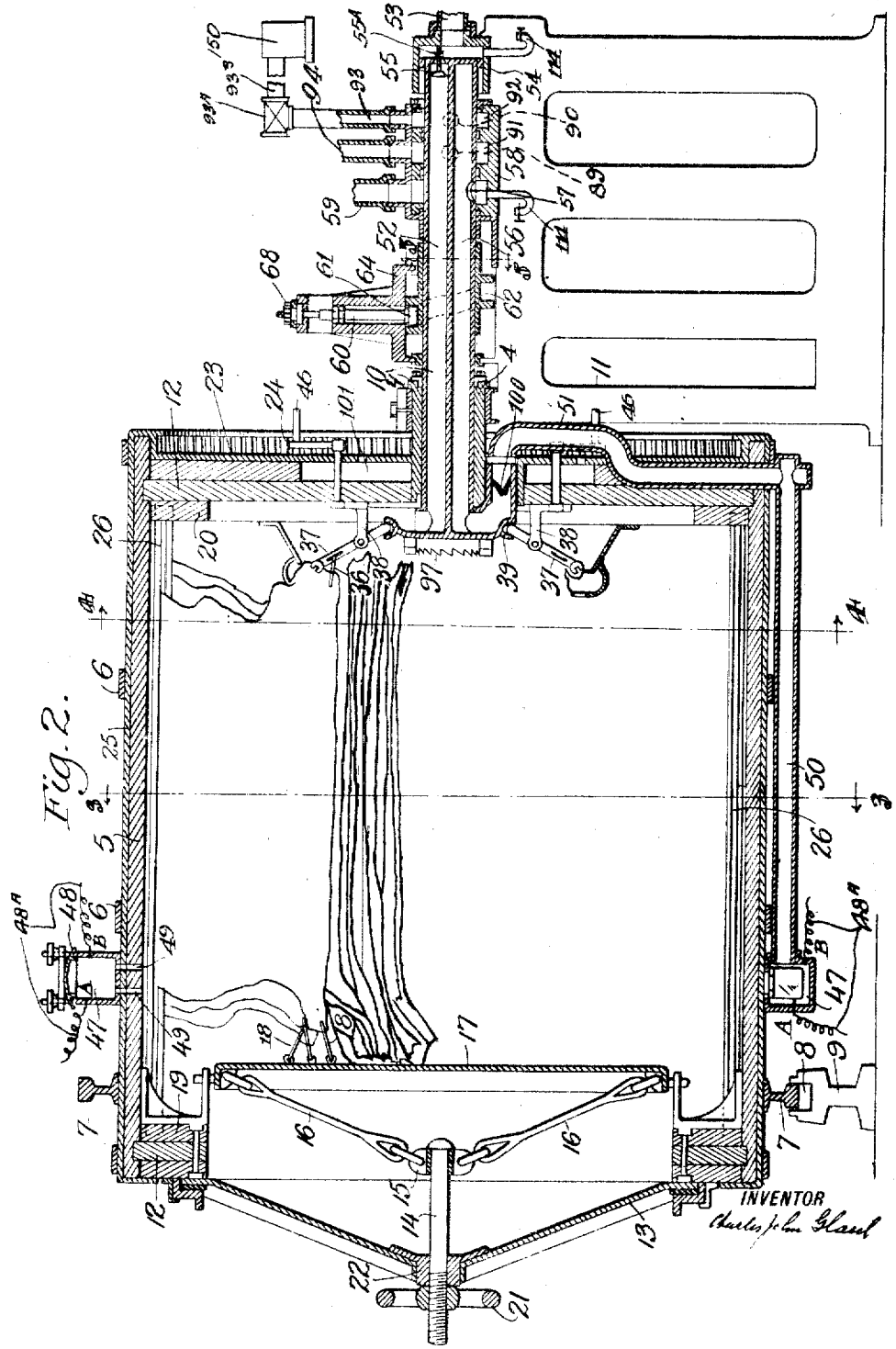

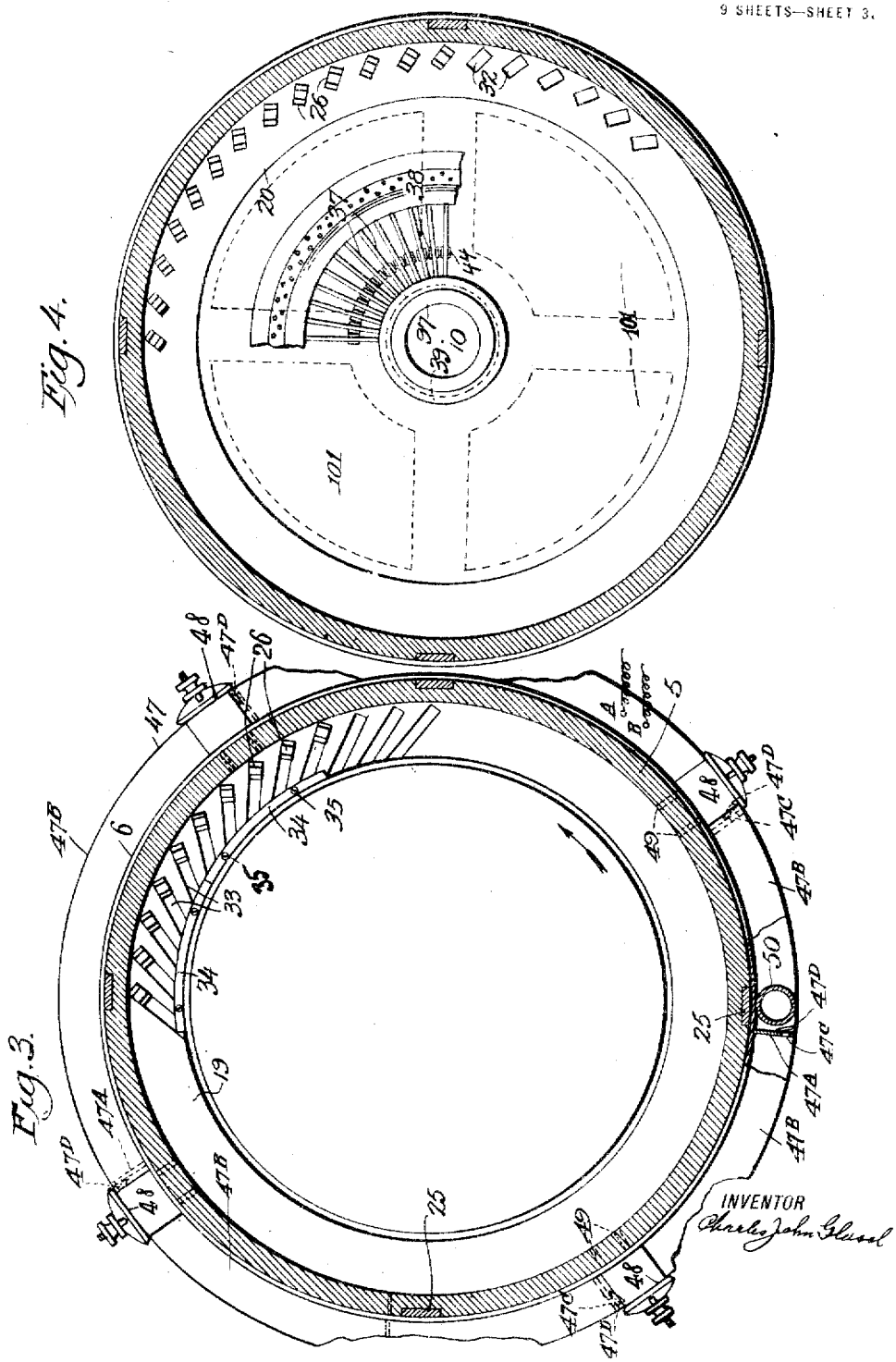

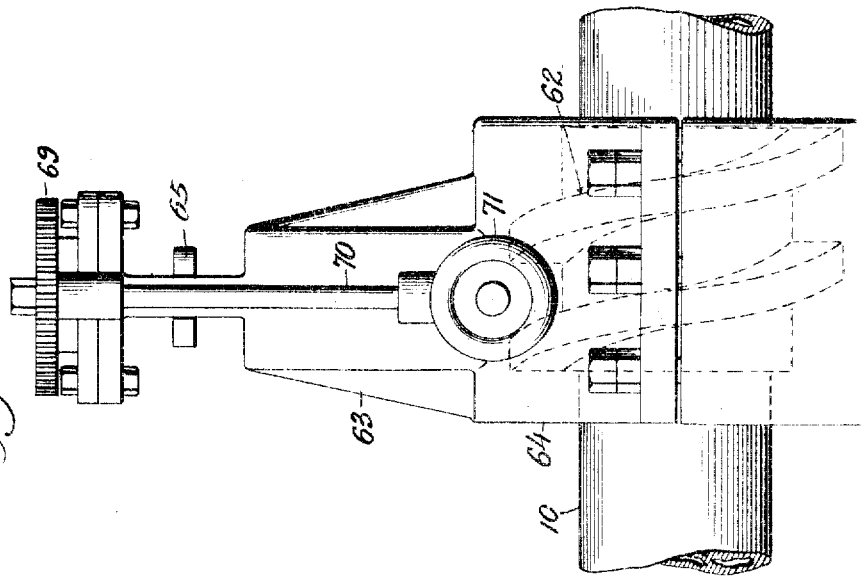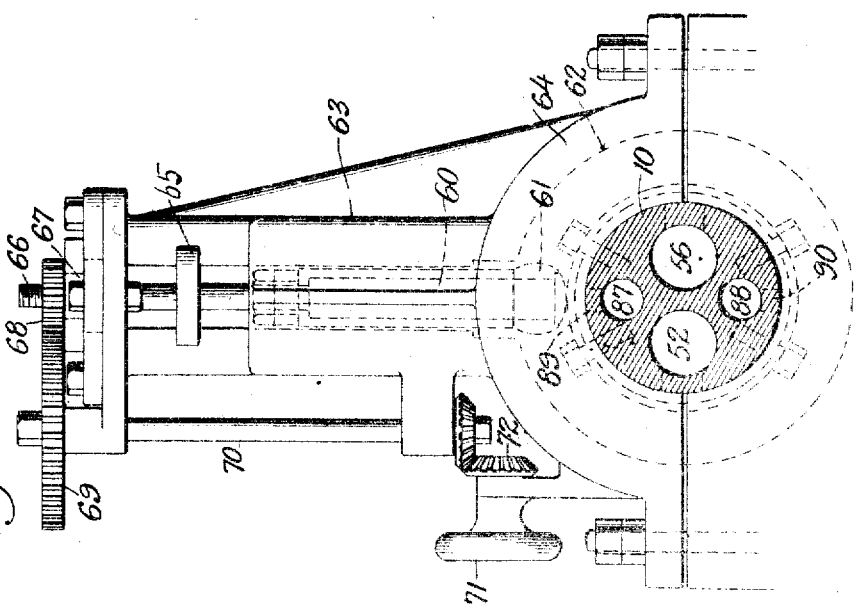

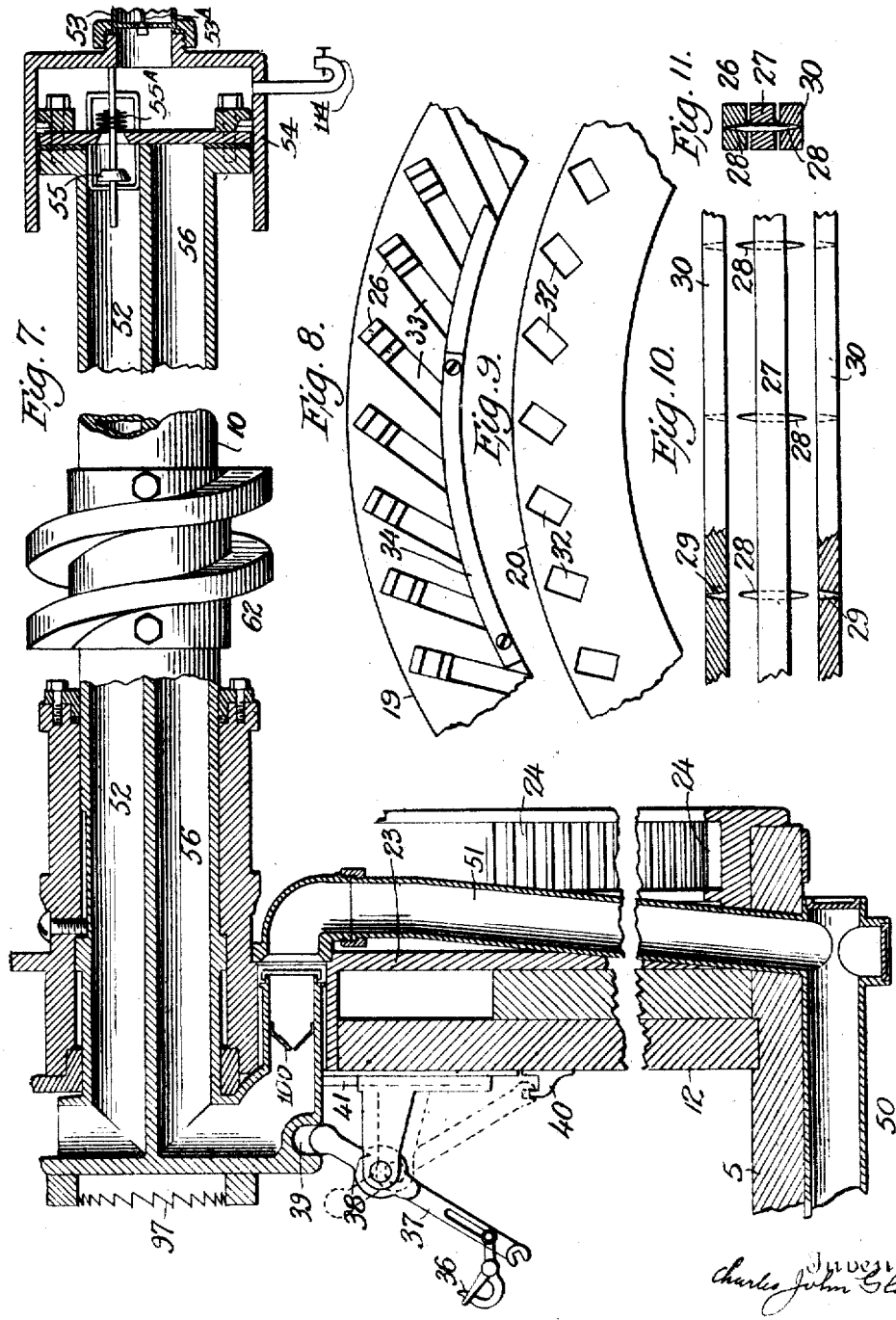

C. J. GLASEL.
PROCESS OF TREATING HIDES AND HIDE TREATING APPARATUS.
APPLICATION FILED APR. 12, 1917.

1,414,404.

Patented May 2, 1922.
9 SHEETS—SHEET 6.

Inventor
Charles John Glasel

C. J. GLASEL.
PROCESS OF TREATING HIDES AND HIDE TREATING APPARATUS.
APPLICATION FILED APR. 12, 1917.
1,414,404.
Patented May 2, 1922.
9 SHEETS—SHEET 7.
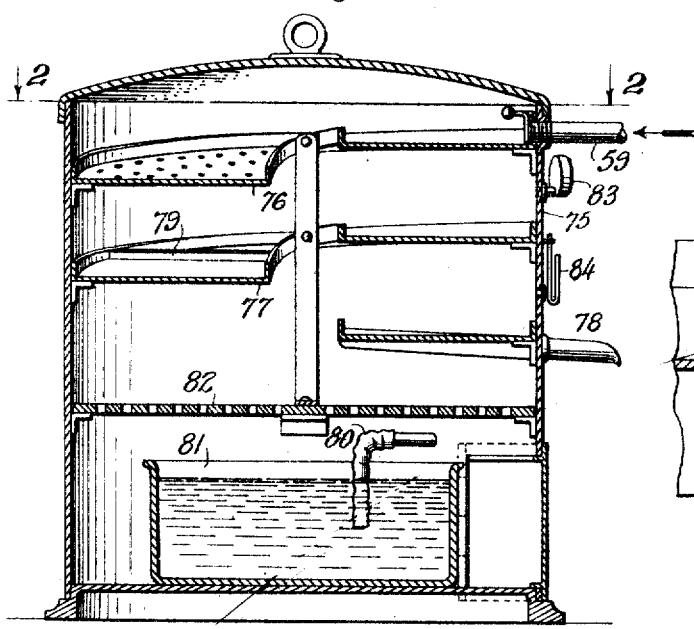
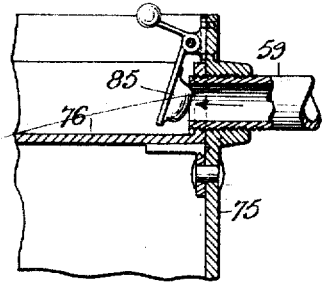
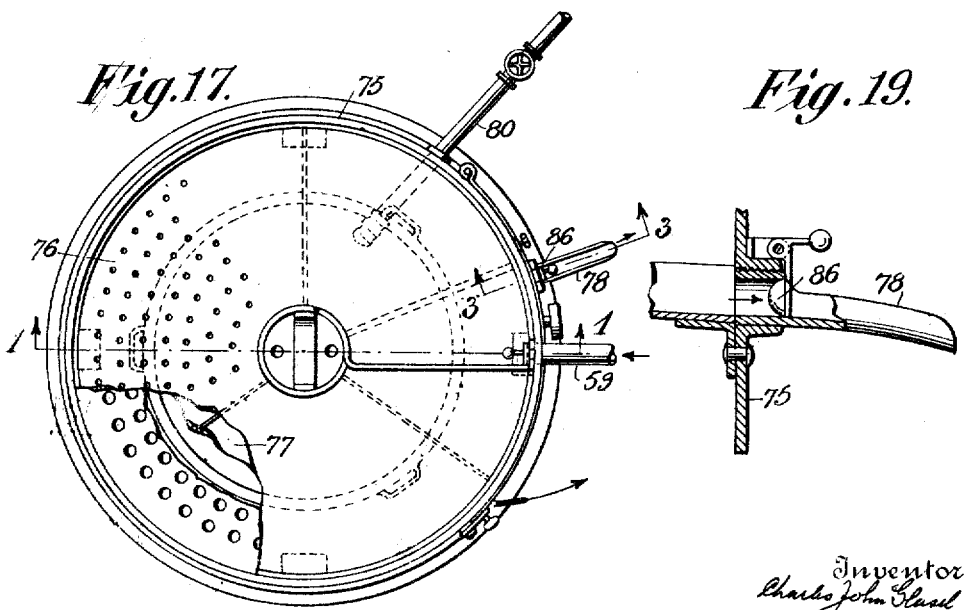
Inventor
Charles John Glasel

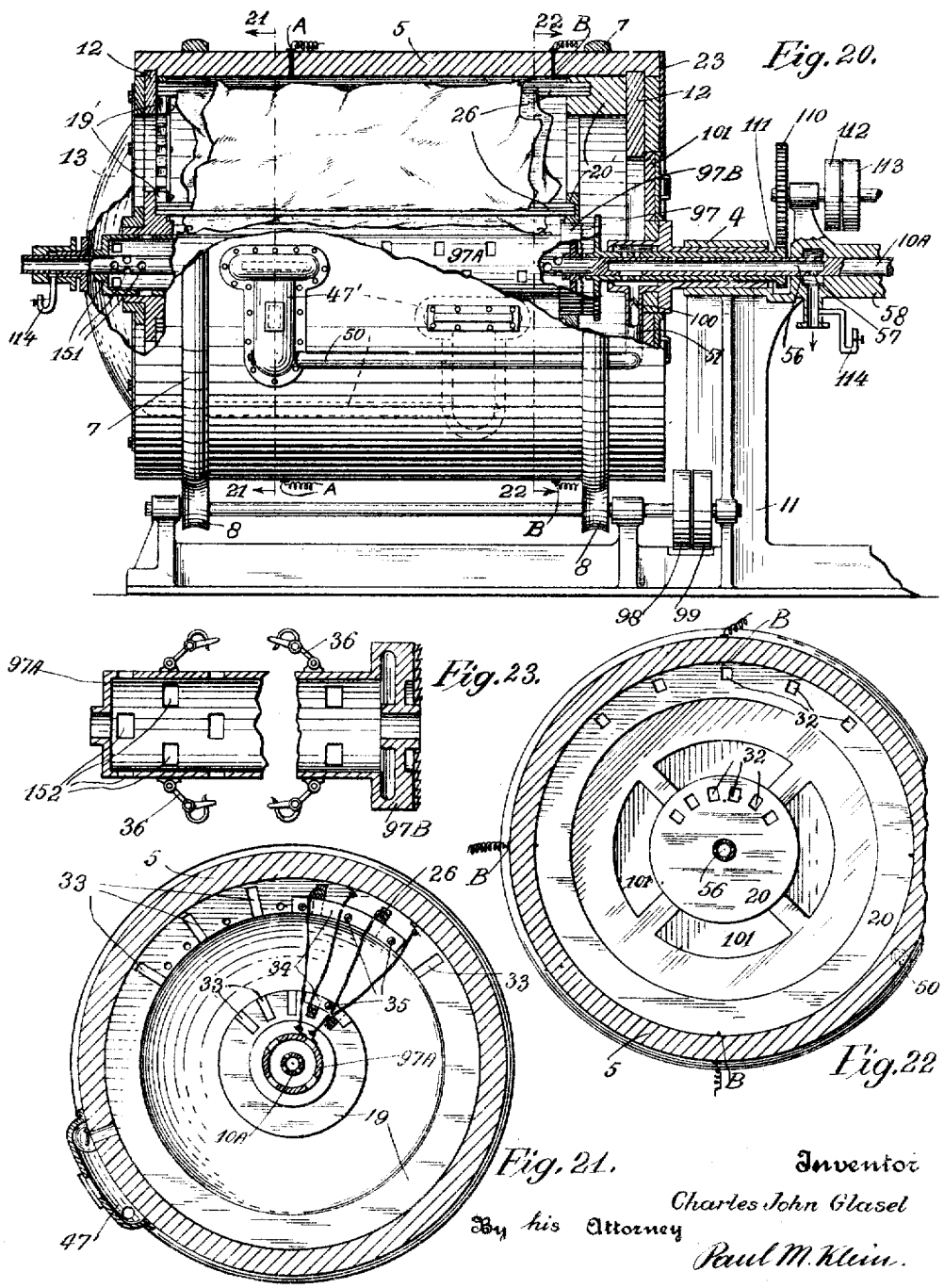

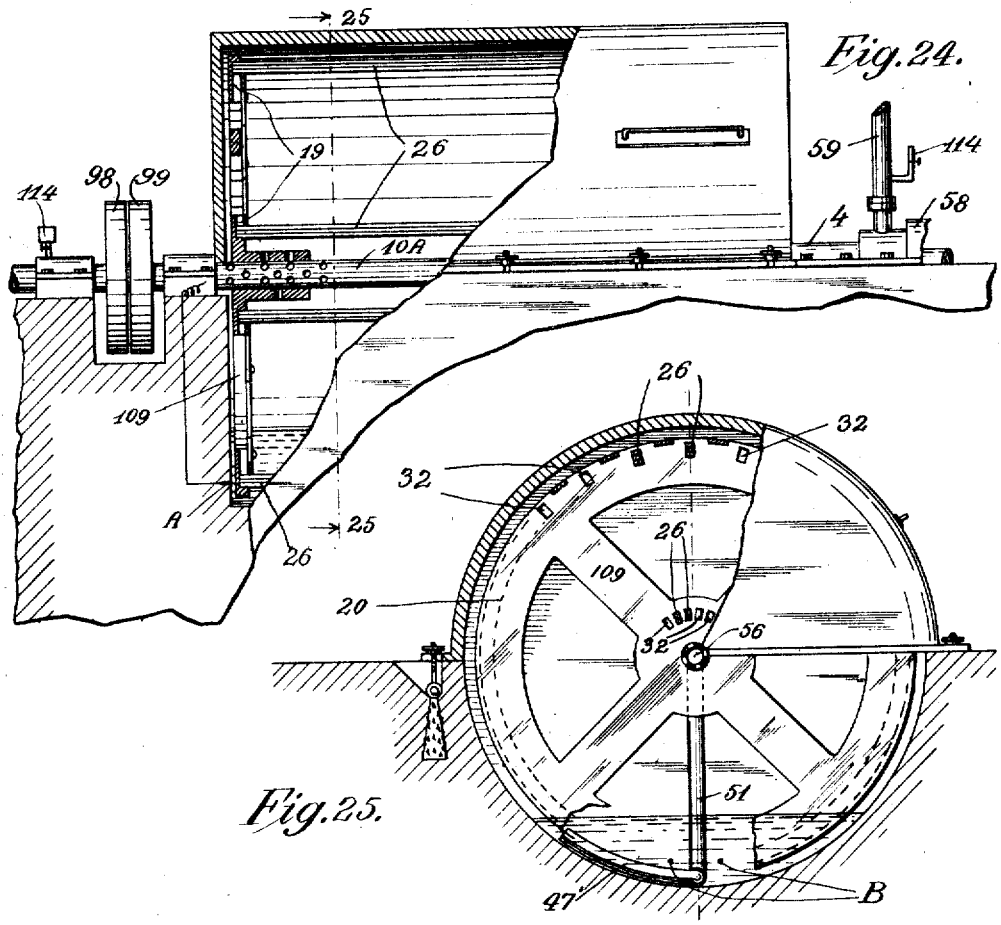
Fig. 24.
Fig. 25.
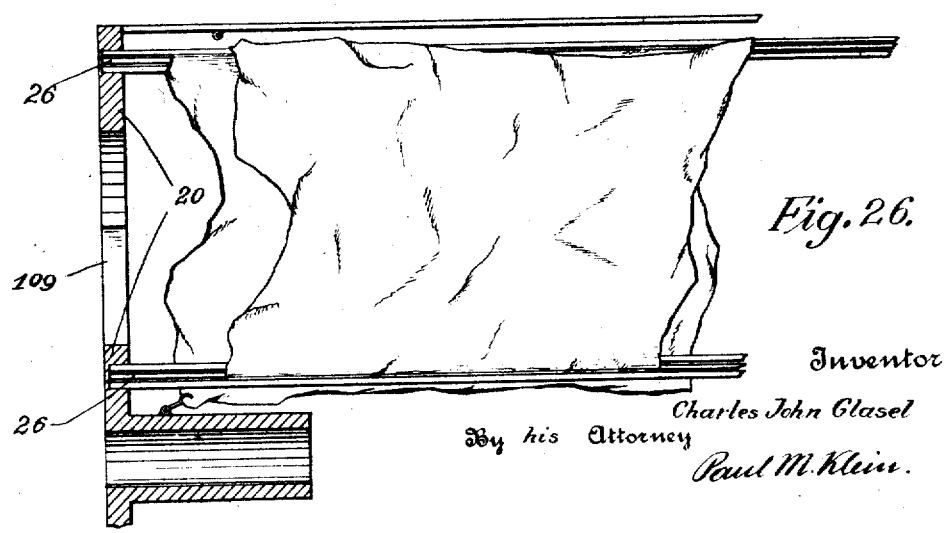
Fig. 26.
Inventor
Charles John Glasel
By his Attorney
Paul M. Klein.

UNITED STATES PATENT OFFICE.

CHARLES JOHN GLASEL, OF NEW YORK, N. Y., ASSIGNOR, BY MESNE ASSIGNMENTS, TO LUISE HAGEN GLASEL, OF NEW YORK, N. Y.

PROCESS OF TREATING HIDES AND HIDE-TREATING APPARATUS.

1,414,404.     Specification of Letters Patent.     Patented May 2, 1922.

Application filed April 12, 1917. Serial No. 161,449.

*To all whom it may concern:*

Be it known that I, CHARLES JOHN GLASEL, a citizen of the United States, residing at New York, in the county of New York and State of New York, have invented new and useful Improvements in Processes of Treating Hides and Hide-Treating Apparatus, of which the following is a specification.

This invention relates to a process for depilating, treating and tanning hides, skins, and parts thereof and to a device facilitating such treatments.

One object of this invention is to provide a process or method for depilating, tanning and treating in large quantities hides, skins, etc., in whole or in parts thereof, suspended and confined within a rotatable receptacle under the influence of prepared solids, liquid or gaseous treating media, and exposed to temperature and pressure changes, and to the influence of an electric current, while said hides are being alternately stretched and relaxed, i. e. "worked" artificially in a curvilinear manner from points other than that of their suspension, or moved bodily within their confinement, without being artificially worked.

The artificial curvilinear manner of working causes a "full or supreme treatment" of the hides by opening and closing their pores and by stretching and contracting the hides whereby the solid parts of the tanning or other tanning and treating agents, which become solid through the process or when entering into the pores and in between the fibrous web structure of the hides developed by their treatment, are retained therein, while the liquid or gaseous agents are expelled by the contraction of the pores and web. The artificial curvilinear manner of working is applicable individually to any one hide and may be reduced or stopped entirely by means from outside the apparatus at any desired time without interrupting the tanning and treating process of that or any other hide. A natural "working" or "plain" or "secondary" treatment may be substituted for the artificial "working" or "full" treatment, said "plain" treatment consisting in "breathing" of the hides while moving bodily in their confinement and without being otherwise mechanically agitated. The "breathing" is a sort of a siphon action caused by the affinity of one to the other of the hides and by their bodily motions toward and from each other when revolving. When descending, the hides draw together, when ascending they separate.

Another object of this invention is to provide a machine in which the process of treating may be carried out on agitated hides, skins, etc., hermetically confined in the presence of organic and inorganic agents used either together or individually, and especially the treatment with a solution of metallic ingredients, like compositions of antimony salts, etc., carbonates and hydroxides, under the influence of a vacuum or pressure as required.

A further object of the invention involves the construction of the machine wherein the process may be carried out in continually injecting, exchanging, replenishing, strengthening, purifying, differently mixing, converting, heating, cooling said tanning and treating agents during the period of the treatment of the rotatably suspended hides confined in a rotatable container, and while said hides are being worked mechanically in a curvilinear manner, all this being made possible at any time during the uninterruped continuation of the process.

Another object is the provision of a means for accomplishing a process or method of directly treating hides, skins, etc., with gaseous agents without interfering with either the mechanical or the aforementioned chemical treatments of the hides, and while the chemical or physical metamorphosis of the treating ingredients is going on.

A further object of the invention is to provide a process or method for treating hides, skins, etc., confined in a container, whereby the interior may be cooled off to a freezing temperature chemically, by creating a vacuum, or by using still other means, employing either one of these methods separately or in combination, or whereby the interior may be heated to any desired temperature either chemically, physically or mechanically, and whereby such temperature may be either maintained or changed as is deemed necessary while the other mechanical and chemical treatments of the hides are taking place without the interruption of the process.

Still another object of this invention consists of to provide a process of treating the hides by agents of any desired specific gravity or density and changing the specific gravity or density at any time during the treating process and without interrupting it. For instance starting the treatment with agents of high specific gravity or density, and subsequently decreasing the specific gravity or density of the agents, by increasing their temperature, changing the pressure within the container or introducing certain gaseous agents into the container, to obtain a thorough penetration of the treating agents into the hide structure.

A further object of this invention is the process of treating hides confined in a container with agents, mechanically agitating and causing a wave-like motion of said agents, and circulating these agents in such a manner as to produce a spray upon the hides, in order to insure a proper treatment and thorough penetration of said agents in and to all parts of the hides.

Another object of this invention is to provide apparatus so arranged as to enable all the foregoing chemical, physical and mechanical phases of the process to take place and to be modified by several independent sources, and to allow the individual curvilinear artificial manner of working of the hides, skins, etc., from other points than those of their suspension, providing means whereby the curvilinear manner of working of any or some or all of the hides may be stopped or reduced from outside of the machine, according to the treatment necessary for each individual hide, and providing means for substituting for the curvilinear manner of working a natural working of the hides, a record, description or pedigree of each hide or skin being provided for outside of the machine, indicating the length of time required for the adequate full treatment of each individual hide, and eliminating therefore the necessity of the reopening of the rotating receptacle for inspection.

The foregoing and other objects of the invention will be more fully apparent in the following specification describing the process or method, and the drawings illustrating preferred forms of the devices employed in the process, which drawings represent a material part of this application, and in which:

Fig. 2 is a vertical sectional view of the same.

Fig. 3 is a transverse sectional view taken on line 3—3 of Fig. 2.

Fig. 4 is a similar transverse sectional view taken on line 4—4 of Fig. 2.

Fig. 5 is an enlarged vertical sectional view taken on line 5—5 of Fig. 2.

Fig. 6 is a similarly enlarged side view of a portion of the machine shown in Figure 5.

Fig. 7 is an enlarged fragmental longitudinal sectional view and part longitudinal of part of the rear head and supporting axle of the machine.

Fig. 8 is a fragmental plan view of the annular support for the hide suspending slats.

Fig. 9 is a similar view of the oppositely disposed support.

Fig. 10 is a fragmentary view showing in detail the arrangement of slats when spread.

Fig. 11 is a cross-sectional view of the slats when in operative engagement.

Fig. 16 is a vertical sectional view of the replenishing chamber.

Fig. 17 is a partial plan and cross-sectional view of the same.

Fig. 18 is a sectional view showing the inlet valve.

Fig. 19 is a similar view showing the outlet valve.

Fig. 20 is a side elevation partially in section of a modification of the apparatus.

Fig. 21 is a transverse sectional view taken on line 21—21 of Fig. 20.

Fig. 22 is a transverse sectional view taken on line 22—22 of Fig. 20, showing a modified form.

Fig. 23 is a vertical sectional view of an exchangeable central element of the apparatus.

Fig. 24 is a side elevation partially in section of a stationary apparatus.

Fig. 25 is a transversal sectional view taken on line 25—25 of Fig. 24.

Fig. 26 is a vertical sectional view of the hide supporting frame.

Figure 1:
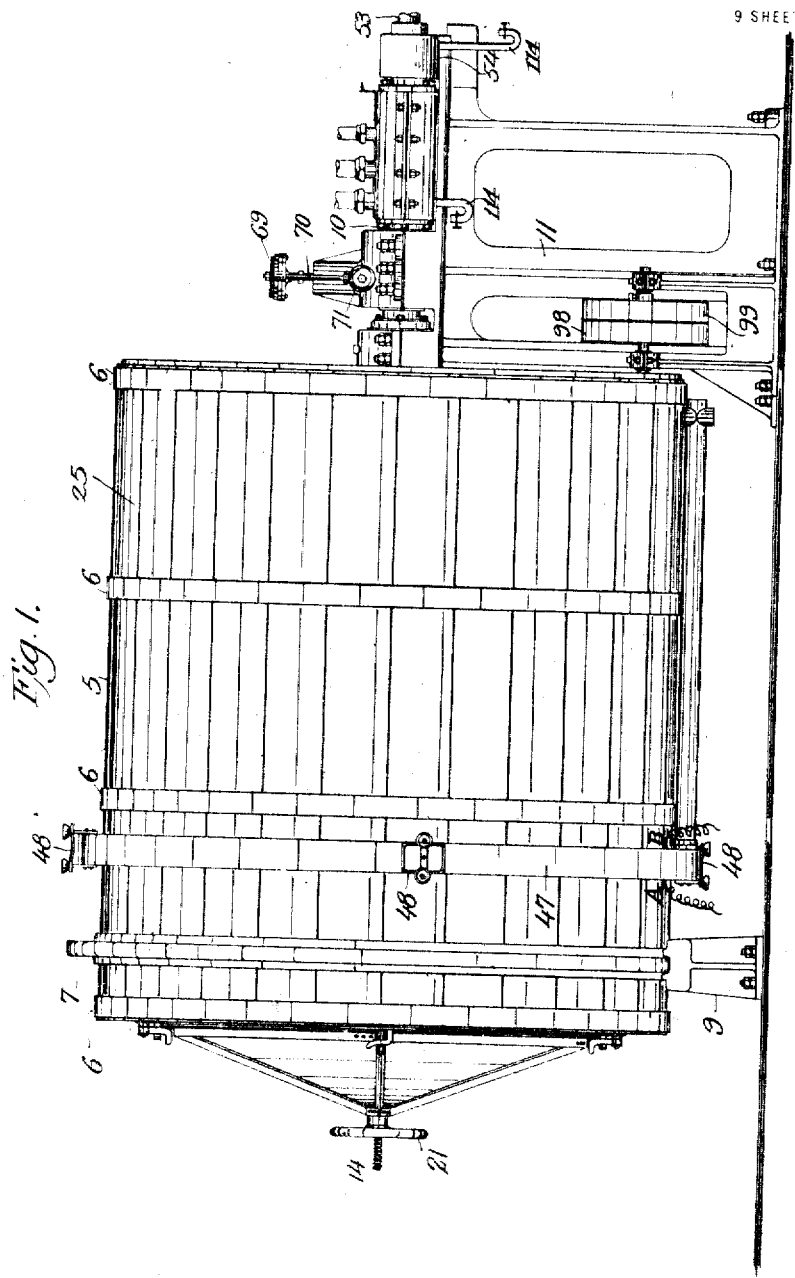
Fig. 1 is a side elevation of the complete apparatus.

In ordinary apparatus for treating hides, suspended in a closed receptacle, it has been found that the weakening of the different tanning medium during the process necessitates the frequent opening of the receptacle to recharge or renew it with agents of the proper strength. This results in delays, entailing loss of labor, material and time, as opening the receptacle allows the partly finished leather to come in contact with the atmosphere and consequently to set, and thereby necessitates repeating the process in order to obtain the desired results.

The agitation of the hides and the supply and combination of the treating medium are of course subject to the control of the operator, which will be hereinafter more fully disclosed.

To facilitate the process of the present invention by which these defects among others are overcome, there is also involved the provision of an apparatus, as illustratively disclosed in the attached drawings, as an aid in carrying out the process.

This apparatus will now be described in connection with the improved process, so that the process, as well as the preferred forms of apparatus, will be easily understood by those skilled in the art.

The receptacle 5 (Figures 1 and 2) consists of a cylinder bound by hoops 6, and having near one end a curved rail 7, completely encircling the cylinder and adapted to rotate upon roller bearings 8, mounted in a low pedestal 9, supporting the receptacle at that end. The other end of the receptacle is supported by a bearing 4, containing the piston 10, mounted on the upright pedestal 11, the piston containing a number of passages and being so arranged as to turn with the receptacle in either direction in which it may rotate.

At both ends of the receptacle 5 are wooden heads 12, that end upon which the rail 7 is engaged having a metal head 13 secured to the wooden head, and passing centrally through an opening in the head 13 is an adjustable screw 14 provided with a swivel 15, connected by links 16 with a movable frame 17, carrying fasteners 18, to which the hides may be secured. Attached to the wooden heads 12 are rings 19 and 20, the function of which will be hereinafter more fully specified.

The screw 14 is adjusted by means of the hand wheel 21, having a screw threaded hub, bearing upon the sleeves 22 set in an opening in the head 13. The opposite end of the receptacle also has a metal head 23, the exterior of which is formed into an internal spur gear wheel 24, the metal heads being engaged together by means of a plurality of metal strips 25 passing longitudinally from end to end and over the exterior of the receptacle, forming in effect a skeleton frame engaging both metal heads. The receptacle head next to the piston has several air-tight closing doors 101 provided to facilitate the suspension of the hides in the receptacle.

The hides are hung into slots 26 formed by three bars comprising a central element 27, and two side elements 30, the former having double pointed pins 28 adapted to enter sockets 29 of the side elements 30, after passing through the hides. When the hides are secured and the elements closed together, one end of the bars or slats is inserted into the closed sockets 32 of the ring 20, and the other end into the open sockets 33 of the ring 19.

As will be seen in Figures 3, 4, 8, 9, sockets 32 and 33 are formed in circles and at an angle to the radii of said circles and equally spaced and are of sufficient size to contain one or more ends of such complete hide suspensions. After placing these hide suspensions into the sockets 33, which are open on one side, thus permitting the free entrance of the ends of the bars, sectors 34 are applied to the ring containing the bars so as to lock same in the sockets 33. The sectors are held by screws 35 or other convenient means.

The free corners of each hide may be engaged by hook fasteners 36, attached to levers 37, pivoted in brackets 38, which are slidably mounted on guides 41, attached to the head 12 radially to and around the horizontal axis of the receptacle, the shorter lever ends opposite the attaching hooks being suited to enter the annular groove 39 formed around the inner end of the piston 10. When the latter reciprocates, the levers are oscillated toward and from the head 12, thereby alternately stretching and relaxing the hides in such relation to the longitudinal axis of the receptacle and according to the different speed of rotation of the receptacle, to cause the hides and skins to move in a curvilinear or wave like manner. The amount of stretching may be controlled by the hand wheel 21. These manipulations give heretofore unknown and quite remarkable results, as to the increase of the effective treating and tanning surface, and may be repeated as many times as deemed necessary.

Figure 13:
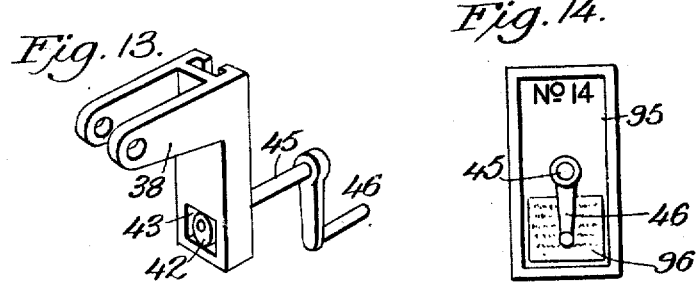
Fig. 13 is a perspective view of a lever disengager.
Figure 14:
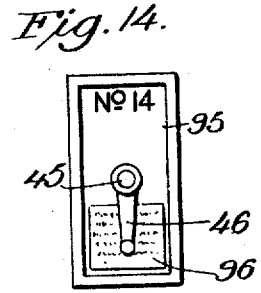
Fig. 14 is a front plan view of the same.

In the event it is desired to render the levers 37 inoperative, their forked outer ends, moved toward the head of the receptacle by the inward movement of the piston 10, are adapted to engage with the hooks 40. In order to engage with the hooks, the brackets 38 must be shifted outward from the center upon their radial guides 41 into a position indicated in dotted lines in Figure 7, so as to disengage the shorter end of the lever 37 from the annular groove 39 of the reciprocating piston 10. This is accomplished from the exterior of the receptacle by means of the eccentrics 42 operated in rectangular recesses 43 of the bracket 38, by shafts 45 extending outward through the head of the receptacle and suited to receive a crank arm 46, the position of which also indicates the location of the bracket, as shown in Figure 13.

By this means one or all of the levers 37 may be operated from the outside of the receptacle and either held in position to oscillate, causing the agitation of the hides, or may be locked so as to remain quiescent, holding the hides in a dormant condition inside of the receptacle, allowing only their "breathing" and their bodily motion through the tanning agents within the rotating machine.

Above each of the crank arms 46, which extend outwardly through the end of the receptacle, are placed index cards 95 upon which may be made a record 96 of the special nature of the hide with which the connecting hook is engaged, so that the necessary treatment may be given to each individual hide.

Around the outside of the receptacle 5, as shown in Figures 1, 2 and 3 is a hollow annular ring 47 divided by partitions 47^A into chambers 47^B each chamber having a passage way opening outward, provided with removable air-tight covers 48, whereby access to the interior of the ring may be had. Into any of these chambers 47^B different chemicals may be inserted which, during the rotation of the receptacle, come in contact with the other treating medium, causing reactions of different sorts, producing the cooling or heating of the agents, etc. These evolutions may be aided by passing an electric current into the medium as indicated at A & B located between the strips 25. The ring 47 with its chambers 47^B for receiving chemicals represents one of the independent sources from which a replenishing, changing, mixing, converting, cooling, heating, etc., of the treating and tanning medium may take place.

Some of the chambers 47^B connect through perforations 49 with the interior of the receptacle, the chambers being adapted to receive antimony salts or the like, which are dissolved by the heat of an electric current into the liquids used and enters into the container through perforations 49, and the electric connections are shown by 48^A on Figs. 1 and 2.

All partitions 47^A dividing the ring 47 into chambers, have communicating openings 47^C near the outer shell of the ring, so that the tanning liquids may freely flow from one chamber into the other when reaching their lowest position during the rotation of the receptacle. These communicating openings however, possess check-valves 47^D which open in the direction of the rotation and close by gravity when ascending after having passed the lower part of the vertical axis of the receptacle, thus preventing the tanning liquids gathered at the lowest portion of ring 47, from escaping from the ascending chamber into the next one now reaching its lowest position.

The tanning and treating liquids are thus elevated within the chambers above the plane of the horizontal axis of the receptacle and drip through perforations 49 upon the hides. From one of these chambers however, the liquids flow by gravity through the single longitudinally disposed connecting pipe 50, and the radial pipe 51 into the passage 56 of the piston 10, passing the checkvalve 100 now open, located in the inner piston head. This chamber having no perforations, forces the liquid to flow through its only outlet into pipe 50. The checkvalve 100 closes and prevents the back-flow of the liquids from the piston passage back into pipe 51 when beneath the plane of the horizontal axis of the receptacle. The conduit 56 of the piston 10 has an opening 57 terminating in an annular recess of the piston bearing 58 which latter is connected by means of a pipe 59 and a pump 102 (indicated in Fig. 15) with a percolator seen in Figures 15, 16, and 17. Thus the liquids may be drained out of the rotating receptacle without necessitating its opening.

The percolator, into which the exhausted tanning liquids contained in pipe 59 are passed or syphoned (by means of a pump or any other suitable arrangement) from the rotating receptacle, serves to purify, replenish or change the chemical composition of the tanning or treating media, during which process it may be also cooled or heated. The medium thus improved and of proper temperature may be brought back into the receptacle and used as fresh supply.

The percolator represents one of the independent sources for metamorphosing and replenishing the media in the rotating, non-stopping receptacle. The construction and operation of the percolator will be hereafter explained.

The interior arrangements of the ring 47 are such, during the rotation of the receptacle, as to cause the medium to be drawn into the conduit 50 from which it flows and is drawn by suction due to the reciprocating movement of the piston. The piston 10 in addition to supporting one end of the receptacle, is bored to provide at least four conduits, as shown in Figures 2 and 5.

Through one of these conduits 52 fresh tanning liquids are supplied by means of the pipe 53 from the percolator or from any other desired source. The pipe 53 equipped with valve 53^A and passing a feeder 103 (shown in Figure 15), and a device 104 for heating or cooling the treating agents from outside, terminates in the hollow head 54 resting upon the outer end of upright pedestal 11 and fills the head with the liquid. A valve 55 is provided at the one end of the conduit 52, projecting into the head 54, the other end, reaching into the interior of the receptacle, being open. The stem of the valve projects through its housing toward the inner wall of the head. When the piston moves toward the receptacle with the valve 55 closed by spring 55^A, the liquids will be sucked from pipe 53 into the hollow head 54 while the suction opens the valve 53^A. On the return stroke of the piston valve 53^A closes and the stem of valve 55 strikes against the inner wall of the head and consequently opens the valve 55, permitting the fresh supply of liquids to enter the conduit, which liquids pass through the open end of the conduit into the receptacle.

Besides conduits 52 and 56, for the draining of liquid agents into and from the receptacle as it rotates, there are other conduits 87 and 88, as shown in Figure 5, providing for, and permitting the gaseous medium to enter or leave the receptacle or used to create changes in temperature, a partial vacuum or a higher pressure in the interior of the receptacle, and they can be also employed to cause a thorough atmospheric ventilation of the device and its interior during the operation.

Actuation of the piston is provided for by means of the double cam 62 fastened upon the piston 10, a roller 61 entering the groove of the cam, the roller being mounted in a bracket 63, the base 64 of which is secured to the upper part of the standard 11.

The roller stem has a fork 65 near its upper end to prevent it from rotating, while at its extreme top 66, is secured a pinion 68, having a screw threaded hub 67. The teeth of the pinion 68 mesh with the spur gear 69, upon the upper end of the shaft 70. This shaft may be rotated by a hand wheel 71, through the pair of bevel gears 72 so as to cause the stem of the roller to be raised and disconnected from the cam; otherwise the stem 60, carrying the roller causes the piston to shift in and out of the receptacle as it is rotated.

Figure 15:
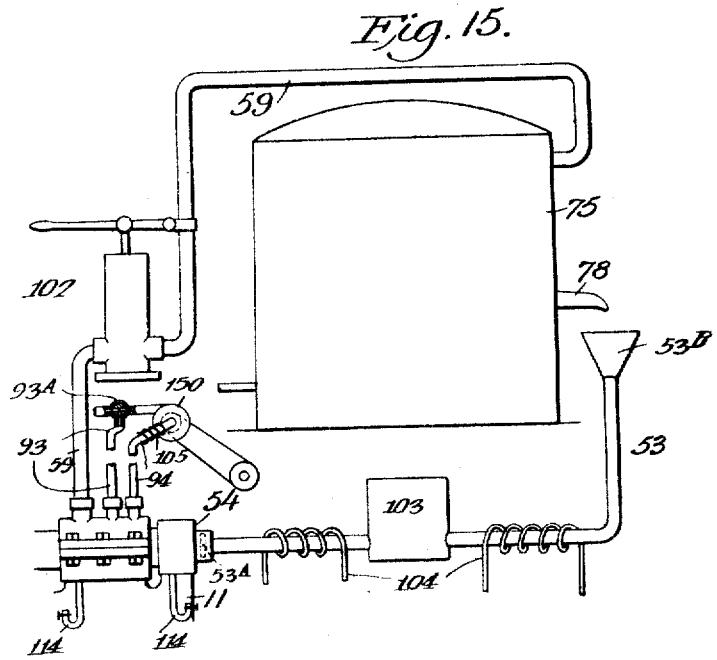
Fig. 15 is a diagrammatic view showing a percolator or formator together with the charging means.

In order to replenish the liquid with ingredients so that a new supply may be furnished to the receptacle, the aforementioned percolator 75 shown in Figures 15, 16, 17 is connected by the pipes 53 and 59 and with the corresponding conduits of the reciprocating piston 10. This percolator is provided with an internal spiral floor, the upper end 76 of which is perforated, the pipe 59 discharging the exhausted liquids drawn from the tanning machine by a pump device 102, into the upper part of the receptacle 75. The liquids pass through the perforations and drop upon the solid spiral floor 77, and finally flow out of the spout 78 and through a funnel 53$^B$ into the pipe 53, which, connected with a "feeder" 103, passes the purified and strengthened liquids back into the receptacle.

A partition 79 divides the spiral tank floor and compels the solutions to pass through the perforations of the upper part and to fall in drops to the lower floor leaving its deposits on the perforated floor.

A pipe 80 conveying suitable medium, (gases or vapors), with which the liquids dropping through the perforations are to be charged, enters and discharges this medium into a purifying fluid in the scrubbing tank 81 placed at the lower part of tank 75. Having passed the fluid, the clean gaseous medium ascends through the perforated partition 82 into the upper portion of tank 75, thus charging the down-flowing liquids. At the upper end of the tank is a gauge 83, indicating the pressure of the liquids and a thermometer 84 showing the temperature. The pipe 59 has an inwardly opening valve 85 while an outwardly opening valve 86 is provided for the spout 78. The mixer or feeder 103, constituting a reservoir or tank into which are placed fresh treating agents to mix with those agents that may be therein, is connected with pipe 53 as shown in Figure 15, which serves to supply the out-flowing liquids with new chemical agents and represents one of the independent sources for replenishing or metamorphosing the treating medium in the rotating receptacle.

The conduits 87 and 88 of the piston 10 for admitting the passage of gases or for atmospheric ventilation of the receptacle 5 have outlets 89 and 90 communicating with channels 91 and 92 in the bearing 58 so that the conduits may communicate with pipe 93 and 94 connected with a convertible vacuum or pressure producing apparatus 150, pipe 93 being provided with a three way valve 93$^A$, thus facilitating the circulation of air, other gaseous or additional liquid agents through the receptacle 5, and enabling, through the setting of valve 93$^A$, the creation of vacuum or pressure within the receptacle. Pipe 94 passes a device 105 for heating or cooling its contents.

The three way valve connected to pipe 93, to a pipe 93$^B$ leading to a convertible vacuum or pressure producing apparatus 150 and to the atmosphere, can be adjusted to connect 93$^B$ with 93 or 93 with the atmosphere or cut off 93 from both atmosphere and pipe 93$^B$.

The inner end of the piston 10$^A$ in Fig. 20 or 10 in Fig. 2 is provided with a toothed part respectively 97 and 97$^B$ shown in Figs. 2 and 20, which teeth are adapted to engage with different exchangeable devices such as shown by Fig. 23 for carrying treating medium.

Figure 12:
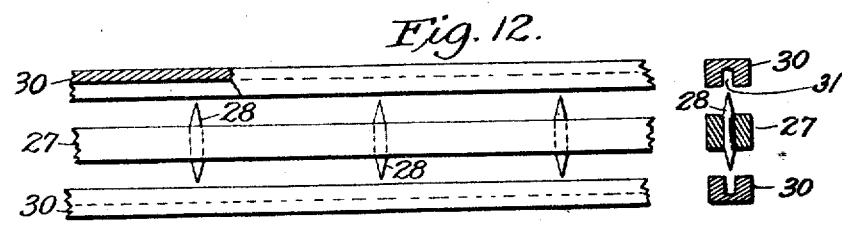
Fig. 12 is a view, similar to Fig. 10, showing a modified form of slat construction.

In Fig. 12 the teeth shown by 97 can be used for a similar device as in Fig. 23 by inserting a special removable frame (not shown) in place of frame 17.

Pulleys 98 and 99 (Figure 1) are mounted on a shaft which is lodged in bearings attached to the upright 11, the shaft having a pinion to engage the teeth 24, formed on the head 23, by means of which the receptacle can be rotated. Instead of a belt drive, an electric motor (not shown) may be employed.

The complete operation and method of carrying out this process of tanning leather by means of the above described apparatus is to take a batch of hides 55 to 70 pounds salted weight in order to produce 50 or 60 pounds of dry, marketable, sole leather.

About 8 days dehairing in the beamhouse— which includes about 3 days soaking and cleansing and 4 days depilating. When this is done, 3 or 4 days elapse before the hides are put in the automatic tanning machine, where they remain for 3 to 4 days—they are then retanned for 4 to 5 days and then dried and finished—which takes from 10 to 12 days. The entire process takes from 26 to 35 days, according to the weight of the hides.

The number of hides may be limited, but the preferable number is from 150 to 200 hides in one batch—or if in sides, the number may be 300 or 400 taken from the beamhouse as they are clearhaired and fastened by the edges in the clamping rods 30. They are then fitted in the slots in the heads 19 and 20 so that the heads and tails of the hides hang down towards the centre of the receptacle and near its ends.

If a full force is employed on a batch of hides for sole leather, the head and tail of each hide is secured to the two ends of the receptacle by means of movable hooks and the machine is closed tight. The machine is put in rotation and the movement of the hides, circulation of the liquors and media are automatically functioned under this treatment. The whole batch of hides comes out equal and identical in every respect—each having been cleaned by the syphon action of luke warm water for about 10 minutes, which suffices to remove all dirt.

After the lukewarm water is withdrawn, this operation is immediately followed by the application of a preparatory media—the base process described in application for Patent Serial No. 182,751 filed July 25th, 1917, instead of the present coloring treatment in handlers.

It is now that the real process of tanning starts—the solutions made and forced in and out of the receptacle, circulating in and around and between the hides, improved by the percolator or other means. The receptacle is rotating all the time while the hides are carried in the interior and they are being intermittently submerged half the time and piling upon themselves as they enter the solution—folding and unfolding one by one at a time, leaving the solution while superimposed and pressing and squeezing out the liquids; finally separating and straining both from gravity and the action of the workable hooks as they move longitudinally back and forth and around with the top of the receptacle.

The strength of the tanning media is constantly increased, electricity is applied as often as necessary, and as the above operation proceeds and is either forced into the container or allowed to run in or drain out by gravity, the hides are alternately submerged and drained, and treated as outlined by the application. The structure of the hides acts like a membrane and absorbs the solution which flows between and over the hides and by its force assists in straining the hides and opening the pores to absorb the solution and by relaxing expels the liquid which is being constantly increased in strength. The amount of solution necessary for a batch of hides is from 65 to 75 gallons. This is sufficient liquid for a constant circulation of a durable stream—enough to completely submerge the hides during part of the rotation and the hides are subjected to flexures and pressures to thoroughly knead the structure of them and their fibres during their compression and expansion, thus subjecting them to all the conditions necessary to effect the thorough and complete impregnation of the hides with the media and draining them of the liquor and stretching them as their hanging bar reaches the upper side of the container.

After 24 hours of this operation, the temperature of the tanning media is raised to 90° Fahr. and 10° Baumé strength. The circulation of the liquid continues and the hooks may be disconnected so that the hides may be acted upon by gravity only, and being gradually saturated with the media while in the lower side of the receptacle, but free to receive gas injections when in the upper side of the tank when the breathing operation takes place and the temperature of the gas and the density of the liquors increased in this way, preparing the hides for their next submersion, and working in curvilineal lines.

As soon as the liquors indicate that the strength of the absorbed media is 20 or 26 Baumé, the operation is stopped, the gas is discharged and the liquid drawn off and purified and stored for future use. The tanned leather taken out of the machines is placed in vats, preferably in a concentrated liquor of 26 to 30 Baumé for 3 to 4 days where the temperature is gradually raised to 110 Fahr. once a day. The hides are then dried and finished by other machinery for consumption.

It must be understood, however, that the treatment of different kinds of hides demands variations of this method, but the changes are slight and simply require different strength media, temperature or length of treatment.

The suspension, agitation and treatment of the hides may be varied according to their quality and the purpose for which they are designed. The treatment may be also distinctly divided into three phases: A, the "preliminary plain treatment" in a stationary closed receptacle with the hides moving bodily therein without any other agitation and being exposed to the influence of constantly circulating improved treating agents, shown in Figures 24, 25 and 26. The hides and skins are held by the holders 26¹ which are located in pockets 20¹ in the end spool or spider 109, rotatably mounted on shaft 10ᴬ. This spider 109 with shaft 10ᴬ is rotatably mounted in a pit or foundation adapted to hold the lower half of the spider as shown in Figs. 24 and 25, the upper half having a removable cover to enclose the rotating element which is revolved by the fixed pulley 99 and carries the loose pulley 98. The treating medium enters the left hand end of $10^A$ in a similar way as shown and described in Fig. 20, through the openings in the shaft $10^A$, into the bottom of the pit and leaves through the pipes $47^1$, $51^1$, and to the pipe $59^A$ by gravity.

The electric connections are shown in Figs. 24 and 25 by letters A and B and the current flows through the treating medium from one end of the pit to the other. B, the "secondary treatment" in a rotary closed receptacle, with the hides moving bodily therein and being partially mechanically agitated under the influence of treating agents being circulated and improved through but one intake and one outlet conduit shown in Figures 20, 21 and 23. C, the "supreme or full treatment" in a rotating closed receptacle with the hides moving bodily therein while being vibrated or otherwise mechanically worked under the influence of manifold agents, the same being injected into and ejected from the receptacle by way of a plurality of conduits, shown in Fig. 2 and in Fig. 3 by 52, 56, 87 and 88. The treating agents are continually circulated and improved while the interior of the receptacle is being subjected to different temperatures and pressures, to ventilation or to a vacuum.

Figures 20, 21, 22, 23, 24 and 25 show apparatus adapted for the first two kinds of treatments. The general construction of these devices is similar to that shown in Figures 1 and 2, but the hides are suspended from the periphery of the receptacle and from the center.

The central portions of the rings—19' and 20'—are affixed to shaft $10^A$ rotating with the receptacle (in Figure 20) or with the hide supporting frame 109 (in Figure 24). Connected to the toothed head ($97^B$) is an exchangeable device $97^A$ which may be used as vibrator for the hides, or as distribution or conduit for different treating agents (Figs. 20 and 23).

Gear 110, meshing with its teeth into gear 111, connected with head 97, may be driven by driving pulley 113, so as to rotate said head 97 in the direction of the rotation of the receptacle and faster than the latter. Thus the teeth of head 97 will rapidly slide upon the toothed head $97^B$ of the device $97^A$ connected with shaft $10^A$ and produce a ratchet like motion of the device $97^A$. This motion, causes certain hides (usually the heavier hides, suspended from the periphery and attached to device $97^A$) to vibrate. A spring (151) keeps the device $97^A$ continually pulling the head 97 by the spring 151 pulling the shaft $10^A$ against $97^A$. When no vibration is wanted, gear 110 is not actuated. The improved treating agents may be injected from either side into the receptacle and drained therefrom by replaceable draining means 47' located inside or outside of the receptacle while draining means shown in Figures 20 and 21 lift the exhausted media from the lower portion of the receptacle and compel them to flow through conduits 50, 51 and 56 into the percolator. Testing stations 114 are provided at both the inlet and outlet openings, to allow the operator to test and control the properties of the treating agents. This drawing means referred to, preferably consists of a pocket $47^1$ covering a valve 152, connected to conduit $50^1$, $51^1$ and 56 which connects to the outside of the container.

The device $97^A$ may be exchanged for another, performing different duties.

The essential feature of this invention is to completely carry out the entire process for each hide individually, thus allowing the depilating, tanning and by this treating process of quantities of hides of different pedigree in the shortest possible time, without interrupting at any time any one of the chemical, physical or mechanical effects which accompany the application of the process of the invention as described in connection with the above description of the preferred apparatus.

The curvilinear method of working the hides actuated from other points than that of their suspension is one of the improved features of the process. It is accomplished through the combination of two differentiating rotary and axial motions of the hides. The "breathing" or the action caused by the bodily motions of the hides toward and from each other during their rotation. The individual manipulation of the hides from outside of the receptacle made possible by the disclosed apparatus, is also a very important item. The conveying of improved treating medium into the receptacle from any one of the several conduits having independent sources is another feature of great advantage.

The application of different new treating agents and especially the introduction of the direct treatment through gaseous media is, another important feature. The provision of making possible the use of treating agents of high density or high specific gravity at the start of the process, produced through certain temperature and pressure changes or by chemical reactions, and the provision of means for reducing or otherwise changing the density or specific gravity of said agents during the operation, to induce thorough penetration of them into the hide structure, is another point of the process. Also the application of electricity, the percolation method, to which all media may be subjected the removal and return of the strengthened liquids, their possible conversion and reconversion, etc., represent items of importance.

Modifications or variations in the construction and use of the described apparatus and in the process itself may be adopted without departing from the original idea of the invention as set forth and any apparatus may be employed in any way that is capable of properly producing the desired result.

While for instance a rotating receptacle is indicated to be at one end rotatably supported at its periphery, the hollow shaft extension of the other end revolving in its long central bearing, with a reciprocating conduitous piston within the hollow shaft, any other device may be introduced to accomplish the purpose sought.

Having thus explained the nature of this invention and described the manner of constructing and using the same, without attempting to set forth all of the forms in which it may be made or all the methods connected with its use, what I claim as new and desire to secure by Letters Patent is:—

1. The process of treating hides and skins secured within a receptacle, comprising moving the hides and skins therein working them from points other than their suspension and circulating a tanning medium within the container without stopping the motion of the containers.

2. The process of treating hides and skins within a receptacle comprising moving them in a culvilinear manner from points other than their points of suspension, subjecting them to the action of a circulating medium, renovating and strengthening the medium without stopping the motion of the container, as set forth.

3. The process of treating hides and skins suspended within a rotatable receptacle comprising moving the hides and skins in a curvilinear manner from points other than their points of suspension, continuously circulating a tanning medium in and out of the receptacle, ventilating the receptacle without stopping the motion of the receptacle, as set forth.

4. The process of treating hides and skins or parts thereof secured within a receptacle comprising moving them in a curvilinear manner from points other than their points of suspension, circulating a medium into and out of the receptacle, applying different temperatures, utilizing the effect of a vacuum and ventilating the receptacle, and contents therein, without stopping the motion of the receptacle, as set forth.

5. The process of treating hides and skins in whole or part, secured within a rotatable receptacle comprising moving them in a circular manner from points other than their points of suspension, circulating a constantly changing tanning medium therein, producing a vacuum, heating and cooling the receptacle and contents and ventilating the receptacle, without stopping the motion of the same, as set forth.

6. The process of treating hides and skins suspended within a rotatable container comprising moving them in a curvilinear manner from points other than those of their points of suspension, subjecting them to the action of a tanning medium circulated into and out of the container and producing a pressure within the container without stopping the motion of the same, as set forth.

7. The process of treating hides and skins secured within a container, comprising moving them in a curvilinear manner from points other than their points of suspension, subjecting them continuously to the action of tanning medium, heating and cooling the medium and renovating and strengthening the medium, without stopping the motion of the container, as set forth.

8. The process of treating hides and skins or parts thereof, suspended within a rotatable container comprising moving them in a curvilinear manner from points other than their points of suspension, applying a series of circulating media, heating the media and ventilating the container during the operation, as set forth.

9. The process of treating hides and skins or parts thereof, suspended within a rotatable container comprising working them in a curvilinear manner from points other than their points of suspension, circulating a treating medium, gradually changing the temperature within the container, producing a vacuum, ventilating the container and renovating the treating medium without stopping the motion of the container, as set forth.

10. The process of treating hides and skins or parts thereof, suspended within a rotatable container comprising moving them in a curvilinear manner, circulating a treating medium having variable temperatures, producing a vacuum, ventilating the container and producing a pressure within the container without stopping the motion of the same, as set forth.

11. The process of treating hides and skins or parts thereof, suspended within a rotatable container comprising working them in a curvilinear manner from points other than their points of suspension, circulating a treating medium in conjunction with gases under pressure, cooling the interior of the container and the medium and strengthening the medium without stopping the motion of the container, as set forth.

12. The process of treating hides and skins or parts thereof, suspended within a rotatable container comprising working the same in a curvilinear manner from points other than their points of suspension, circulating a treating medium, producing a pressure within the container and producing a vacuum within the container without stopping the motion of the same, as set forth.

13. The process of treating hides and skins or parts thereof, suspended within a rotatable container comprising working the same in a curvilinear manner from points other than their points of suspension, circulating treating solutions and gases from different conduits and ventilating the container without stopping the motion of the same, as set forth.

14. The process of treating hides and skins or parts thereof, in a hermetically closable and rotatable receptacle comprising moving the hides and skins or parts thereof, in a curvilinear manner from points other than their points of suspension, constantly circulating and improving the tanning medium by dissolving salts of antimony therein, producing a pressure within the container, ventilating the container, producing a vacuum within the container, purifying and replenishing the medium circulating continuously into and out of the container, without stopping the motion of the container, as set forth.

15. The process of treating hides and skins or parts thereof, suspended within a rotatable container comprising circulating a medium in such quantities as will be immediately absorbed by the hides and skins within the container, ejecting the used material not retained by the treated material in this circulation without stopping the motion of the container, as set forth.

16. The process of treating hides and skins or parts thereof, suspended within a rotatable container comprising circulating a medium that is influenced by the continuously changing chemical condition taking place within the container, in such successive quantities as will be immediately absorbed by the hides held within the container, ejecting in the circulating process the used material not retained by the hides and skins, and purifying and replenishing the medium to be used over again, without stopping the motion of the container, as set forth.

17. The process of treating hides and skins or parts thereof, suspended within a rotatable container comprising circulating a medium which is continuously changing its chemical conditions, using an electric current to melt antimony salts or the like into the circulating medium, using as much medium as will be immediately absorbed into the hides structure, ejecting in the course of circulation the used material not retained by the treated hides, purifying and replenishing the medium to be used over again, without stopping the motion of the container, as set forth.

18. The process of treating hides and skins suspended within a rotatable container, comprising the action of a treating medium and gases within the container, circulating the medium continuously into and out of the container and heating and cooling the medium without stopping the motion of the container, as set forth.

19. The process of treating hides and skins collectively, that are suspended within a rotatable container comprising working the hides and skins in a curvilinear manner from points other than their points of suspension, circulating a treating medium into and out of the container, applying gases under pressure, increasing the circulating media in volume and decreasing it in density, without stopping the motion of the container, as set forth.

20. The process of treating hides and skins or parts thereof, suspended within a rotatable container comprising mechanically working the hides and skins in a curvilinear manner from points other than their points of suspension, continuously circulating the medium and increasing the specific gravity and temperature of the medium without stopping the motion of the container, as set forth.

21. The process of treating hides and skins or parts thereof, suspended in a rotatable container, comprising working the hides and skins in a curvilinear manner from points other than their points of suspension, circulating a treating medium continuously into and out of the container and forcing the medium over the surface of the hides and skins without stopping the motion of the container, as set forth.

22. The process of treating hides and skins or parts thereof, suspended within a rotatable container comprising moving the hides and skins in a curvilinear manner from points other than their points of suspension, circulating a treating medium continuously, alternately causing the hides and skins to be immersed in and emerge from the treating agents and applying an electric current to the medium without stopping the motion of the container, as set forth.

23. The process of treating hides and skins or parts thereof, suspended within a rotatable container, comprising circulating treating solution, removing one solution before another is applied, producing pressure and a vacuum within the container, applying heat to the medium, ejecting the used material from the inside of the container to the outside thereof during the process of circulation, purifying and replenishing the medium and registering the pedigree and indicating the time required for an adequate treatment of each individual hide without stopping the motion of the container, as set forth.

24. The process of treating hides and skins or parts thereof, secured within a rotatable container comprising working the hides and skins in a curvilinear manner from points other than their points of suspension, continuously circulating a treating medium, alternately heating and cooling the medium, producing a pressure within the container, producing a vacuum within the container and renovating and strengthening the tanning medium without stopping the motion of the container, as set forth.

25. The process of treating hides and skins or parts thereof, suspended within a rotatable container comprising working the same in a curvilinear manner from points other than their points of suspension, circulating a treating medium into and out of the container, changing the temperature within the container by heating the medium outside of the container to a desired temperature during its circulation and ejecting the used medium and injecting improved medium without stopping the motion of the container, as set forth.

26. The process of treating hides and skins or parts thereof, suspended within a rotatable container comprising circulating a treating medium subjected to the action of gases under changeable pressure into and out of the container, ejecting the used medium after having utilized part of the same in the course of its circulation, purifying and strengthening the treating medium outside of the container without stopping the motion of the container, as set forth.

27. The process of treating hides and skins or parts thereof, suspended within a rotatable container comprising working the hides and skins mechanically in a curvilinear manner from points other than their points of suspension, circulating the medium into and out of the container while heating and cooling the same, producing a vacuum within the container, ventilating the container, and strengthening the medium either from within or without the container without stopping the motion of the container, as set forth.

28. The process of treating hides and skins or parts thereof, suspended within a rotatable container comprising by circulating a treating medium into and out of the container from end to end, ejecting the used medium and renovating the same in the course of its circulation without stopping the motion of the container, as set forth.

29. In a hide treating apparatus, the combination of a cylindrical wooden receptacle reinforced by hoops rigidly holding the receptacle together with its heads, bearings for said receptacle and means for rotating the receptacle.

30. In a hide treating apparatus, the combination of a receptacle comprising a supporting rail at one end on the periphery, bearings for the supporting rail, an axial conduit carrying shaft at the opposite end of the receptacle, bearings for said shaft, a base to support the apparatus and means to rotate the receptacle.

31. In a hide treating apparatus, the combination of a rotatably mounted receptacle one end of which carries a peripheral rail rotatably supported, the other end supported axially upon bearings is provided with several removable air-tight doors located in the head of the receptacle in proximity to said axial bearing, and integral with said head is an internal gear adapted to be driven by a gear and pulley.

32. In a hide treating apparatus, the combination of a rotatable receptacle comprising manholes with air-tight doors located around the center at one end, a central air-tight door on the opposite end, a frame carrying hide fasteners located in the interior of said receptacle and operated through said door from the outside of the receptacle and means for supporting and rotating said receptacle.

33. In a hide treating apparatus, the combination of a rotatable receptacle comprising an air-tight door at one end, with means, located outside of the receptacle, extending through the air-tight door for moving an adjustable, removable, hide carrying frame carrying hide engaging element, hide engaging elements mounted upon the piston head on the other end of the receptacle and means to rotate said receptacle.

34. In a hide carrying apparatus, the combination of a rotatable receptacle supported at the periphery at one end and axially at the other end, comprising internal tangentially arranged open sockets or pockets opening toward the axis of the apparatus on one end, similar but closed sockets or pockets at the opposite end, hide suspending slats composed of several interengaging elements adapted to enter the aforesaid pockets, rigidly holding one end of the hide or skin, means for holding said slats in said pockets or sockets, axially located hide holding means within at each end of said container and means to rotate the container.

35. In a hide carrying apparatus, the combination of a rotatable receptacle comprising hide suspending means mounted in sockets or pockets inside of the receptacle, hide engaging means located at one end of the interior of said receptacle, a centrally located reciprocating piston projecting through the head at the opposite end of the said receptacle, oscillatable levers mounted in radially adjustable brackets adapted to slide upon radial guides fastened to the inside of said head, one end of which having hide engaging means, and the other connected to said piston, means for engaging and disengaging said levers from the piston, and means to revolve said receptacle.

36. In a hide treating apparatus, the combination comprising a rotatable mounted receptacle, hide holding means within said receptacle, an annular hollow ring adapted to receive liquids located upon the outside of the receptacle, partitions in said ring dividing the same into a plurality of chambers for receiving treating medium, openings provided in one chamber for the insertion of antimony salts or other compounds to be dissolved or heat generated by an electric current, air-tight doors removably engaged with said openings, communicating openings in each partition having check valves which close in the direction opposite to the motion of the receptacle, perforations provided to spray the liquid contents from the hollow annular ring upon the hides, all chambers but one communicating with the interior of the receptacle, a longitudinally disposed conduit outside of the receptacle communicating from this chamber which has no perforations to an axially located conduit and means to revolve the container.

37. In a hide treating apparatus, the combination comprising a receptacle rotatable mounted at one of its ends upon an annular rail located at the periphery of the receptacle, the other end having at its center, an axial hollow shaft constituting a piston revolvable in a long bearing, conduits within said piston communicating from the interior of the receptacle to the atmosphere or devices located outside of the receptacle and means to rotate the receptacle.

38. In a hide treating apparatus, the combination comprising a rotatable receptacle, an annular ring attached to the outside of the receptacle having chambers for receiving salts of antimony to be dissolved by the heat of an electric current, a conduit located upon the periphery of the receptacle connecting the annular ring with an axially located conduit, a piston, one end of which projects into the receptacle, a plurality of conduits within the piston, the inside end of one of the piston conduits communicating with a radially disposed outside conduit connected to the aforesaid peripheral conduit, said conduit adapted to discharge from the annular ring into said piston conduit when said outside conduit is above the horizontal plane bisecting the receptacle, an annular recessed bearing transmitting treating material, a pipe connected to said recess for draining its conduits, a check valve in said piston conduits for preventing the backflow of its contents into the radial outside conduit when the latter is beneath the horizontal plane bisecting the receptacle and means to revolve the receptacle.

39. In a hide treating apparatus, the combination comprising a rotatable receptacle, an axially located piston with one of its ends projecting into the receptacle, said piston located in a long bearing, a plurality of recesses in said bearing, a conduit provided in said piston for discharging the treating materials of the receptacle, a plurality of conduits located within the piston for passing a liquid or gaseous medium into the receptacle, a cylindrical chamber located at the outer end of the bearing said piston sliding into said chamber, a check valve provided in one of the piston conduits opening into said chamber at the outward stroke of the piston and closing at the inward stroke of the piston, communicating passages from the piston conduits into the bearing recesses, conduit means connected to said recesses to a percolator and means to revolve the container.

40. In a hide treating apparatus, the combination comprising a rotatable receptacle, means for suspending hides and skins therein, means for engaging hides from points other than their points of suspension, means for curvilinearly working said hides and skins, means for supplying said receptacle with salts of antimony or other ingredients, means for dissolving the said salts by the heat of an electric current, means for carrying the treating materials into and out of the receptacle and means for rotating the receptacle.

41. In a hide treating apparatus, the combination comprising a rotatable receptacle adapted to hold hides and skins or parts thereof and treating medium, a piston adapted to act as a conduit for carrying the circulating treating medium into and out of the receptacle, simultaneously causing the hides and skins or parts thereof to be worked in a curvilinear manner from points other than their points of suspension, an annular hollow ring outside and around the receptacle communicating with its interior having chambers which are adapted to contain salts of antimony or the like to be dissolved into the medium by the heat of an electric current, a conduit connecting said chamber to a conduit in said piston and means for rotating said receptacle.

42. In a hide treating apparatus, the combination of a rotatable receptacle adapted to contain hides and skins and treating materials, a piston longitudinally movable adapted to rotate with the receptacle, means for reciprocating said piston longitudinally, means for controlling the movement or stopping the reciprocating motion of said piston, conduits for circulating the treating materials into and out of the receptacle and means to rotate the receptacle.

43. In a hide treating apparatus, the combination comprising a rotatable receptacle adapted to contain hides and skins or parts thereof and treating materials, a reciprocating piston located at one end of said receptacle, having conduits through which the said treating materials may pass into and out of the receptacle, a percolator connected to said conduits, pipes to carry said treating material into a percolator adapted to improve and purify the treating agents, conduits for carrying the treating material into the receptacle and means to revolve the receptacle.

44. In a hide treating apparatus, the combination comprising a rotatable receptacle adapted to contain hides and skins and treating agents, a piston provided with conduits adapted to carry gases or produce a pressure within said receptacle, connecting means leading to and from said conduits, pumping means adapted to force gases and produce a pressure within the receptacle, means for ventilating the receptacle, means for applying a vacuum thereto, means for melting materials into the circulating medium and means for rotating the container.

45. In a hide treating apparatus, the combination comprising a receptacle adapted to contain hides and skins or parts thereof, means for mechanically working said hides and skins in a curvilinear manner from points other than their points of suspension, means for constantly circulating treating material into and out of the receptacle during the rotation thereof, means for producing a vacuum within the receptacle, means for increasing the temperature within the receptacle, means for ventilating the interior of the receptacle, means for forcing gases into the receptacle, means for pumping the purified treating materials into the receptacle, means for constantly circulating different treating materials into and out of the receptacle, means for spraying the hides and skins with treating materials, means for regulating, controlling or stopping the mechanical working of the hides in a curvilinear manner located outside of the receptacle without stopping the motion of the receptacle and means for rotating the receptacle.

46. In a hide treating apparatus, the combination comprising a cylinder bound with hoops carrying a rail on one end encircling the same, a roller bearing upon which this end of the cylinder revolves, a base supporting said bearing and a long bearing carrying an axial rotatable conduit carrying piston, a metallic head in one end of said cylinder carrying the said piston and an internal gear attached thereto, a gear and pulley adapted to rotate the cylinder, a removable metallic head adjacent to said rail adapted to hold within the container a metallic head carrying hide fasteners, a screw and wheel for holding said head which carries the hide holders, pockets within the container at each end holding removable hide holders, rings adapted to hold said hide holder within said pockets, a subdivided annular ring around said cylinder adapted to carry treating medium, a conduit connecting said ring with the conduit carrying piston and means to move said piston at the will of the operator.

47. In a hide treating apparatus, the combination comprising a reinforced cylinder rotatably carried on one end by roller bearings and on the other end by a long bearing, a base supporting both bearings, a metallic head on each end of the cylinder, one of which is removably held by an adjustable screw, which carries an internal head provided with hide holders, the other end carrying an axial shaft provided with conduits and projecting through said end, a series of pockets in the interior of the cylinder adapted to hold hide holding bars rigidly by rings therein, a subdivided annular media carrying ring on the periphery of said cylinder connected to a pipe or conduit which connects with the conduit within the said piston, a double cam on said piston, a roller engaging said cam, means for engaging and disengaging said roller and means for revolving the cylinder.

48. In a hide treating apparatus, the combination of a cylindrical receptacle provided with a hermetically closable head, a peripheral bearing for one end and an axial conduit carrying longitudinally moving piston on the other end, an internal head carrying hide holders, means for supporting the hides at points within the container in proximity to the periphery, means for circulating the treating medium into and out of its receptacle, pipes connecting the piston conduits to a percolator and means for revolving the container.

49. In a hide treating apparatus, the combination comprising a receptacle provided with a hermetically closable head, a conduit carrying piston, conduits and means for connecting said piston to the interior of said receptacle, a conduit connecting said piston conduit to a percolator for improving the medium, a combined pump and vacuum device connected to conduits in said piston and to the interior of the receptacle, a three way valve provided connected to the pump line for either producing a pressure or a vacuum within the container or to connect the container to the atmosphere for the purpose of ventilating the same, and means for revolving the container.

50. In a hide treating apparatus, the combination comprising a rotatable receptacle provided with air-tight doors on one end, a hermetically closable head carrying a device in the interior of the receptacle provided with hide holders, a piston provided with conduits and carrying hide holders on the end projecting into the receptacle, hide holders held by rings within pockets located in the ends of the heads within the container adjacent to the periphery of the receptacle, a subdivided annular ring transmitting the medium through conduits to the conduit in the said piston, conduits transmitting the medium from the piston conduit to the percolator and means to revolve the receptacle.

51. In a hide treating apparatus, the combination comprising a receptacle containing longitudinally movable and mechanically workable hides and skins, treating material circulating into and out of the receptacle, testing stations for testing the properties of the treating materials and means for changing the properties of the treating materials.

In testimony whereof I have signed my name to this specification.

CHARLES JOHN GLASEL.